(12) United States Patent
Jan

(10) Patent No.: US 9,154,675 B2
(45) Date of Patent: Oct. 6, 2015

(54) IMAGE CAPTURING MODULE FOR REDUCING ASSEMBLY TILT ANGLE

(71) Applicant: LARVIEW TECHNOLOGIES CORP., Taoyuan County (TW)

(72) Inventor: Shin-Dar Jan, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 52 days.

(21) Appl. No.: 14/065,390

(22) Filed: Oct. 28, 2013

(65) Prior Publication Data

US 2015/0116589 A1      Apr. 30, 2015

(51) Int. Cl.
*H04N 5/225*      (2006.01)

(52) U.S. Cl.
CPC ........... *H04N 5/2252* (2013.01); *H04N 5/2254* (2013.01)

(58) Field of Classification Search
CPC ............................ H04N 5/2252; H04N 5/2254
USPC .................................................. 348/340, 374
See application file for complete search history.

(56) References Cited

U.S. PATENT DOCUMENTS

| 6,686,588 B1* | 2/2004 | Webster et al. ............... 250/239 |
| 7,126,637 B2* | 10/2006 | Nakamura et al. ............ 348/340 |
| 2008/0297645 A1* | 12/2008 | Lo et al. ........................ 348/340 |
| 2012/0314122 A1* | 12/2012 | Yamashita .................... 348/360 |

* cited by examiner

*Primary Examiner* — Gevell Selby
(74) *Attorney, Agent, or Firm* — Li & Cai Intellectual Property (USA) Office

(57) ABSTRACT

An image capturing module for reducing assembly tilt angle includes an image sensing unit, an optical auxiliary unit and a leveling auxiliary unit. The image sensing unit includes a carrier substrate and an image sensing chip disposed on the carrier substrate and electrically connected to the carrier substrate. The optical auxiliary unit includes a housing frame disposed on the carrier substrate to cover the image sensing chip and a lens assembly disposed inside the housing frame and above the image sensing chip. The leveling auxiliary unit includes a plurality of adhesive materials disposed on the image sensing chip and a light-transmitting leveling substrate supported above the image sensing chip by the adhesive materials. The housing frame directly contacts and downwardly abuts against the light-transmitting leveling substrate, and each adhesive material is formed by mixing adhesive glue and a plurality of micro support bodies.

5 Claims, 4 Drawing Sheets

IMAGE CAPTURING MODULE FOR REDUCING ASSEMBLY TILT ANGLE

BACKGROUND OF THE INVENTION

1. Field of the Invention

The instant disclosure relates to an image capturing module, and more particularly to an image capturing module for reducing assembly tilt angle.

2. Description of Related Art

Recently, it becomes more and more popular for portable devices such as mobile phones or PDA to be equipped with an imaging module. Furthermore, since the market requires these portable devices to have more powerful functions and smaller sizes, it is necessary for the imaging module to generate high quality pictures and to be of small size accordingly. One improvement of picture quality is to increase the number of pixel. The pixel number of an imaging module has already increased from the VGA-level 30 pixels to 2, 5, 8, 13 or even 41 million pixels, which is now common in the market. Another improvement lies in the definition of the image. Thus, the imaging module of a portable device also develops from a fixed-focus mode to auto-focus mode or even optical zoom mode.

The auto-focus mode employs the principle of moving the lens in the imaging module suitably according to various distances of targets, whereby the optical image of the desired target can be focused correctly on an image sensor so as to generate a clear image. The common ways of activating the lens to move in the imaging module include activating by a stepping motor, piezoelectric motor and voice coil motor (VCM). However, both the image sensor and the sensor holder are disposed on the same datum plane of the circuit board, thus the assembly tilt angle of the sensor holder relative to the image sensor is increased to decrease the image quality provided by the imaging module.

SUMMARY OF THE INVENTION

One aspect of the instant disclosure relates to an image capturing module for reducing assembly tilt angle.

One of the embodiments of the instant disclosure provides an image capturing module for reducing assembly tilt angle, comprising: an image sensing unit, an optical auxiliary unit and a leveling auxiliary unit. The image sensing unit includes a carrier substrate and an image sensing chip disposed on the carrier substrate and electrically connected to the carrier substrate. The optical auxiliary unit includes a housing frame disposed on the carrier substrate to cover the image sensing chip and a lens assembly disposed inside the housing frame and above the image sensing chip. The leveling auxiliary unit includes a plurality of adhesive materials disposed on the image sensing chip and a light-transmitting leveling substrate supported above the image sensing chip by the adhesive materials, wherein the housing frame directly contacts and downwardly abuts against the light-transmitting leveling substrate, and each adhesive material is formed by mixing adhesive glue and a plurality of micro support bodies.

More precisely, the image sensing chip has an image sensing area on the top side thereof for providing a first alignment base level, and the light-transmitting leveling substrate has a flat top surface on the top side thereof for providing a second alignment base level, wherein the light-transmitting leveling substrate is disposed on the first alignment base level of the image sensing area of the image sensing chip for obtaining a first assembly tilt angle of the light-transmitting leveling substrate relative to the image sensing area of the image sensing chip, and the housing frame is disposed on the second alignment base level of the flat top surface of the light-transmitting leveling substrate for obtaining a second assembly tilt angle of the housing frame relative to the flat top surface of the light-transmitting leveling substrate, wherein the first assembly tilt angle is close to or the same as the second assembly tilt angle.

More precisely, the image sensing chip has an image sensing area, a plurality of conductive pads and a support contacting area that is not occupied by the image sensing area and the conductive pads, and the image sensing area, the conductive pads and the support contacting area are disposed on the top side of the image sensing chip, wherein the adhesive materials are disposed on the support contacting area of the image sensing chip, and the adhesive materials are separated from the image sensing area and the conductive pads for preventing the image sensing area and the conductive pads from being contacted by the adhesive materials.

More precisely, the light-transmitting leveling substrate is a flat glass plate, the micro support bodies are microspheres having the same size, and the height of the light-transmitting leveling substrate relative to the image sensing chip is adjusted according to the microspheres of the same size.

Another one of the embodiments of the instant disclosure provides an image capturing module for reducing assembly tilt angle, comprising: an image sensing unit, an optical auxiliary unit and a leveling auxiliary unit. The image sensing unit includes a carrier substrate and an image sensing chip disposed on the carrier substrate and electrically connected to the carrier substrate. The optical auxiliary unit includes a housing frame disposed on the carrier substrate to cover the image sensing chip and a lens assembly disposed inside the housing frame and above the image sensing chip. The leveling auxiliary unit includes a light-transmitting leveling substrate disposed between the image sensing chip and the housing frame and a plurality of micro spacers extended downwardly from a bottom surface of the light-transmitting leveling substrate to directly contact the image sensing chip, wherein the light-transmitting leveling substrate is supported above the image sensing chip by the micro spacers, and the housing frame directly contacts and downwardly abuts against the light-transmitting leveling substrate.

Yet another one of the embodiments of the instant disclosure provides an image capturing module for reducing assembly tilt angle, comprising: an image sensing unit, an optical auxiliary unit and a leveling auxiliary unit. The image sensing unit includes a carrier substrate and an image sensing chip disposed on the carrier substrate and electrically connected to the carrier substrate. The optical auxiliary unit includes a housing frame disposed on the carrier substrate to cover the image sensing chip and a lens assembly disposed inside the housing frame and above the image sensing chip. The leveling auxiliary unit is supported above the image sensing chip, wherein the housing frame is disposed on the image sensing chip through the leveling auxiliary unit, and the housing frame directly contacts and downwardly abuts against the light-transmitting leveling substrate.

Therefore, when the housing frame is disposed on the image sensing chip through the leveling auxiliary unit, the light-transmitting leveling substrate can be supported above the image sensing chip by the micro support bodies having the same size or the micro spacers having the same size, and the housing frame can be used to directly contact and downwardly abut against the light-transmitting leveling substrate, thus the first assembly tilt angle of the light-transmitting leveling substrate relative to the image sensing area of the image sensing chip is very close to or the same as the second assembly tilt angle of the housing frame relative to the flat top surface of the light-transmitting leveling substrate. Hence, the assembly tilt angle of the housing frame relative to the image sensing chip can be reduced for ensuring the flatness of the housing frame relative to the image sensing chip.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
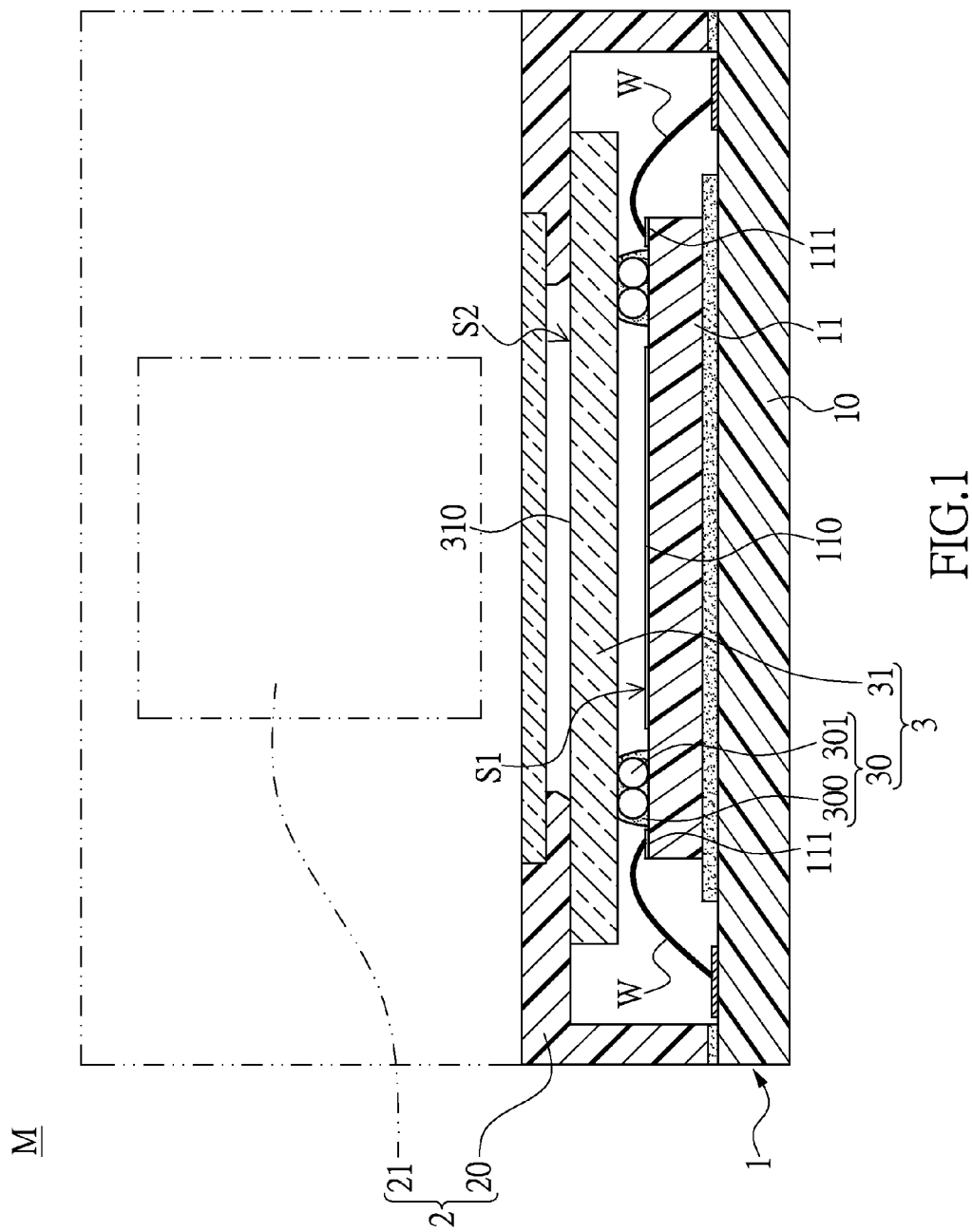
FIG. 1 shows a lateral, cross-sectional, schematic view of the image capturing module for reducing assembly tilt angle according to the first embodiment of the instant disclosure.
Figure 2:
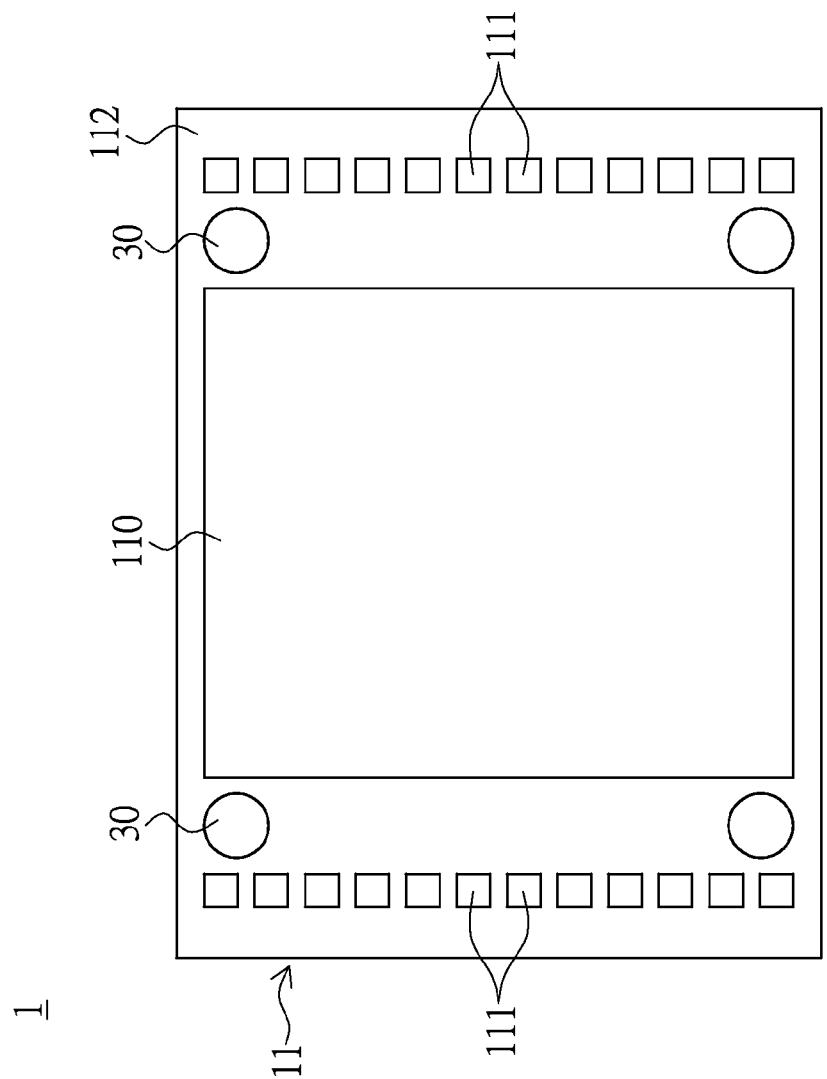
FIG. 2 shows a lateral, cross-sectional, schematic view of the image capturing module using a voice coil actuator according to the first embodiment of the instant disclosure.
Figure 3:
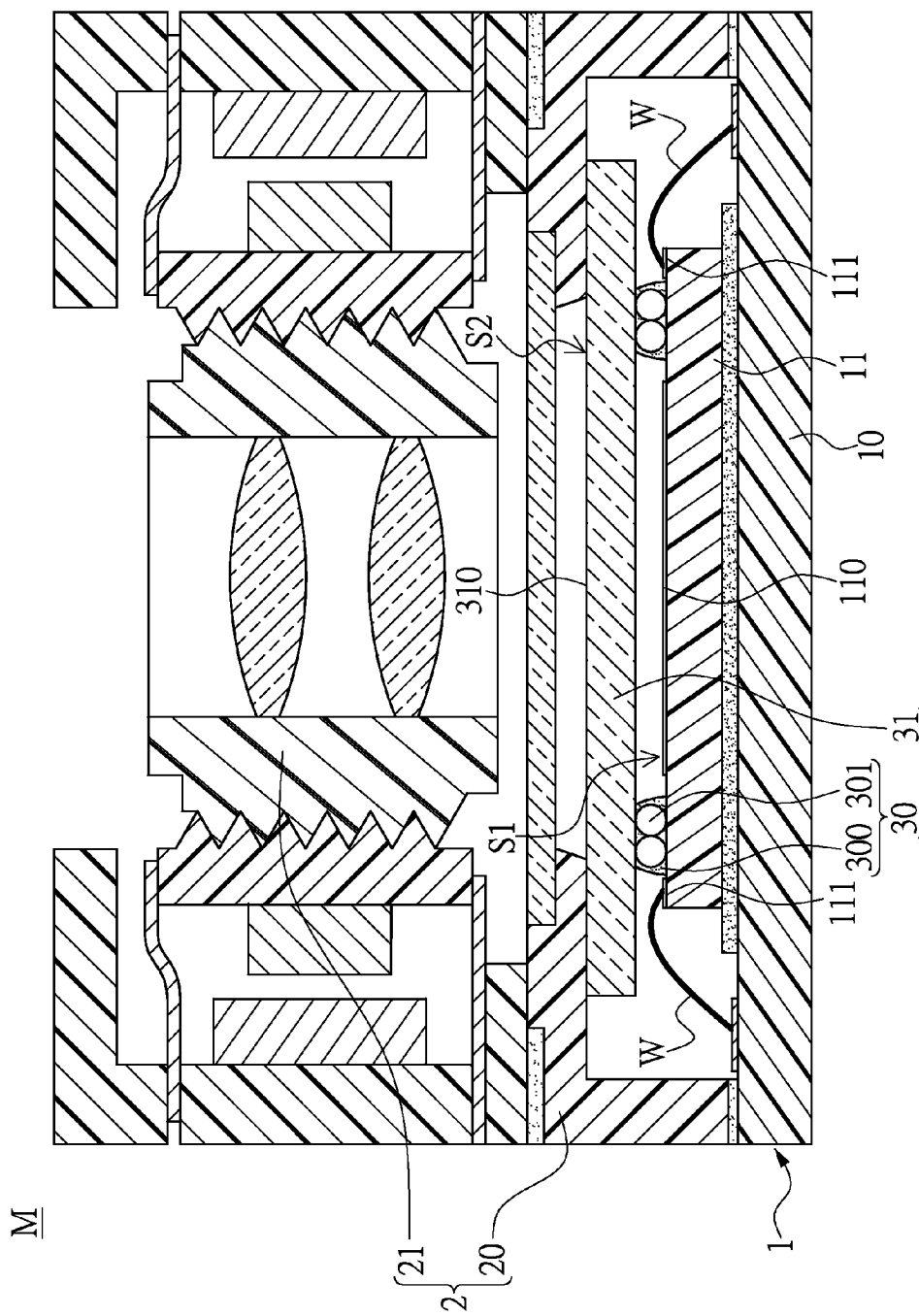
FIG. 3 shows a top, schematic view of the image sensing unit of the image capturing module according to the first embodiment of the instant disclosure.

Referring to FIG. 1 to FIG. 3, where the first embodiment of the instant disclosure provides an image capturing module M for reducing assembly tilt angle, comprising: an image sensing unit 1, an optical auxiliary unit 2 and a leveling auxiliary unit 3.

First, referring to FIG. 1 and FIG. 2, the image sensing unit 1 includes a carrier substrate 10 and an image sensing chip 11 disposed on the carrier substrate 10 and electrically connected to the carrier substrate 10. For example, the image sensing chip 11 can be adhesively disposed on the carrier substrate 10 through any type of adhesive material (not labeled) such as UV adhesive glue, thermosetting glue or oven curing glue etc. In addition, the carrier substrate 10 may be a circuit substrate having a plurality of conductive pads (not labeled) disposed on the top surface of the circuit substrate, and the image sensing chip 11 has a plurality of conductive pads 111 disposed on the top surface of the image sensing chip 11. Each conductive pad 111 of the image sensing chip 11 can be electrically connected to the corresponding conducive pad (not labeled) of the carrier substrate 10 through the corresponding conducive wire W, thus the image sensing chip 11 can be electrically connected with the carrier substrate 10 through the conductive wires W.

Moreover, referring to FIG. 1, the optical auxiliary unit 2 includes a housing frame 20 (such as a sensor holder) disposed on the carrier substrate 10 to cover the image sensing chip 11 and a lens assembly 21 disposed inside the housing frame 20 and above the image sensing chip 11. For example, the housing frame 20 can be adhesively disposed on the carrier substrate 10 through any type of adhesive material (not labeled) such as UV adhesive glue, thermosetting glue or oven curing glue etc., and the lens assembly 21 may be composed of a plurality of optical lens (not labeled). In addition, the optical auxiliary unit 2 may be a voice coil actuator, but the voice coil actuator used in the first embodiment is merely an example and is not meant to limit the instant disclosure. Besides, the optical auxiliary unit 2 can be composed of a fixed plastic holder and a fixed lens assembly fixedly disposed in the fixed plastic holder through fastening glue.

Furthermore, referring to FIG. 1 and FIG. 2, the leveling auxiliary unit 3 includes a plurality of adhesive materials 30 disposed on the image sensing chip 11 and a light-transmitting leveling substrate 31 supported above the image sensing chip 11 by the adhesive materials 30. In addition, the housing frame 20 can directly contact and downwardly abut against the light-transmitting leveling substrate 31, and each adhesive material 30 is formed by mixing adhesive glue 300 and a plurality of micro support bodies 301. For example, referring to FIG. 2, the image sensing chip 11 has an image sensing area 110, a plurality of conductive pads 111 and a support contacting area 112 that is not occupied by the image sensing area 110 and the conductive pads 111, and the image sensing area 110, the conductive pads 111 and the support contacting area 112 are disposed on the top side of the image sensing chip 11. The adhesive materials 30 are disposed on the support contacting area 112 of the image sensing chip 11, and the adhesive materials 30 are separated from the image sensing area 110 and the conductive pads 111 for preventing the image sensing area 110 and the conductive pads 111 from being contacted by the adhesive materials 30. For example, the light-transmitting leveling substrate 31 is a flat glass plate having an infrared (IR) coated layer and/or an antireflection (AR) coating layer for replacing the IR glass and/or the AR glass on the housing frame 20. The adhesive glue 300 can be made of epoxy or silicone, and each micro support body 301 may be a microsphere made of glass, PE (polyethylene), silica or polymer etc. In addition, the micro support bodies 301 are microspheres having the same size, and the height of the light-transmitting leveling substrate 31 relative to the image sensing chip 11 can be adjusted according to the microspheres of the same size.

More precisely, referring to FIG. 1, the image sensing chip 11 has an image sensing area 110 on the top side thereof for providing a first alignment base level S1, and the light-transmitting leveling substrate 31 has a flat top surface 310 on the top side thereof for providing a second alignment base level S2. In addition, the light-transmitting leveling substrate 31 can be disposed on the first alignment base level S1 provided by the image sensing area 110 of the image sensing chip 11 for obtaining a first assembly tilt angle of the light-transmitting leveling substrate 31 relative to the image sensing area 110 of the image sensing chip 11, and the housing frame 20 can be disposed on the second alignment base level S2 provided by the flat top surface 310 of the light-transmitting leveling substrate 31 for obtaining a second assembly tilt angle of the housing frame 20 relative to the flat top surface 310 of the light-transmitting leveling substrate 31. Whereby, when the housing frame 20 is disposed on the image sensing chip 11 through the leveling auxiliary unit 3, the light-transmitting leveling substrate 31 can be supported above the image sensing chip 11 by the micro support bodies 301 of the same size, and the housing frame 20 can be used to directly contact and downwardly abut against the light-transmitting leveling substrate 31, thus the first assembly tilt angle of the light-transmitting leveling substrate 31 relative to the image sensing area 110 of the image sensing chip 11 is very close to or the same as the second assembly tilt angle of the housing frame 20 relative to the flat top surface 310 of the light-transmitting leveling substrate 31. Hence, the assembly tilt angle of the housing frame 20 relative to the image sensing chip 11 can be reduced for ensuring the flatness of the housing frame 20 relative to the image sensing chip 11.

Second Embodiment

Figure 4:
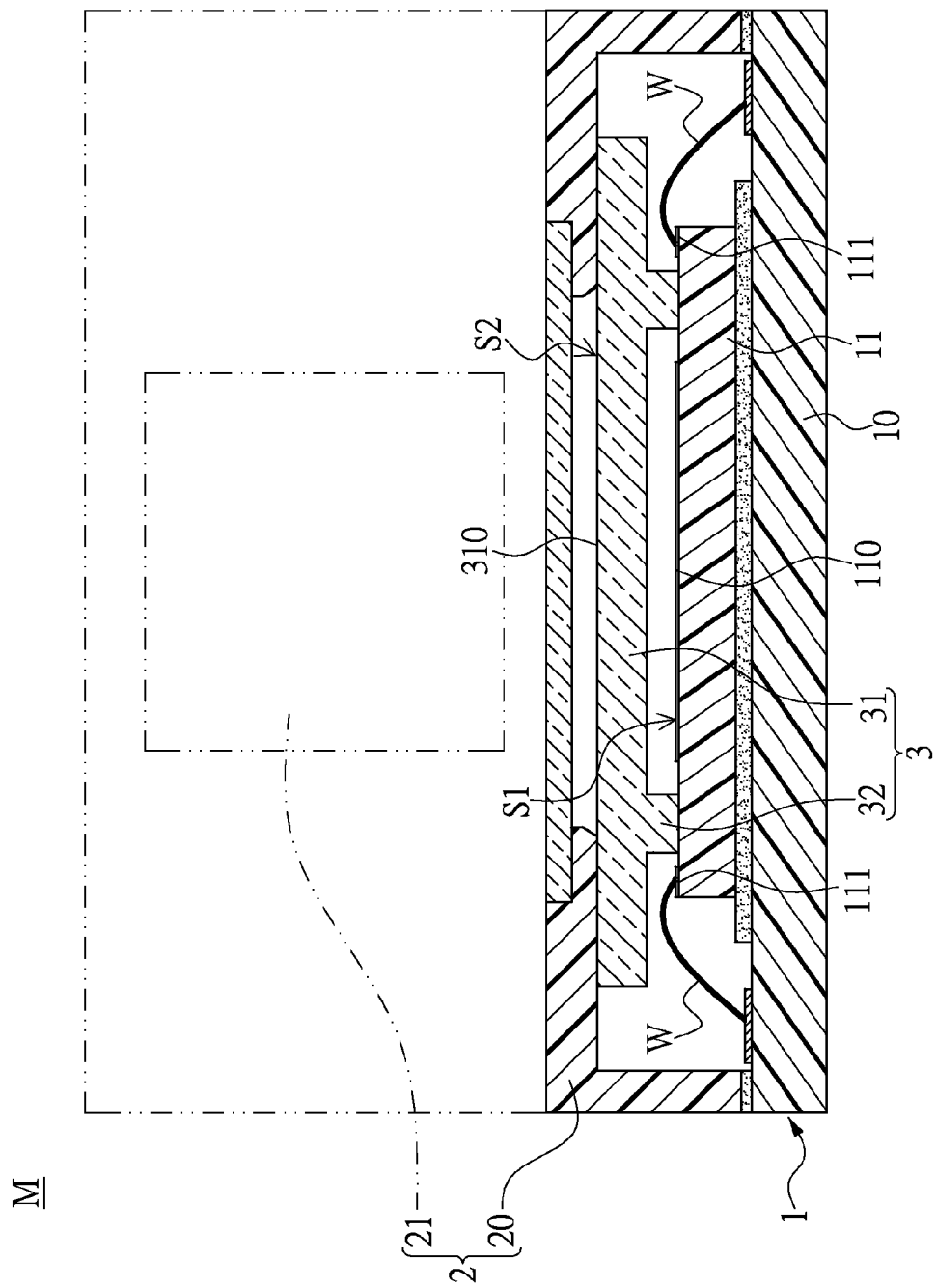
FIG. 4 shows a lateral, cross-sectional, schematic view of the image capturing module for reducing assembly tilt angle according to the second embodiment of the instant disclosure.

Referring to FIG. 4, where the second embodiment of the instant disclosure provides an image capturing module M for reducing assembly tilt angle, comprising: an image sensing unit 1, an optical auxiliary unit 2 and a leveling auxiliary unit 3. Comparing FIG. 4 with FIG. 1, the difference between the second embodiment and the first embodiment is as follows: in the second embodiment, the leveling auxiliary unit 3 includes a light-transmitting leveling substrate 31 disposed between the image sensing chip 11 and the housing frame 20 and a plurality of micro spacers 32 extended downwardly from a bottom surface of the light-transmitting leveling substrate 31 to directly contact the image sensing chip 11. In addition, the light-transmitting leveling substrate 31 can be supported above the image sensing chip 11 by the micro spacers 32, and the housing frame 20 can directly contact and downwardly abut against the light-transmitting leveling substrate 31.

More precisely, the image sensing chip 11 has an image sensing area 110, a plurality of conductive pads 111 and a support contacting area 112 that is not occupied by the image sensing area 110 and the conductive pads 111, and the image sensing area 110, the conductive pads 11 and the support contacting area 112 are disposed on the top side of the image sensing chip 11. In addition, the micro spacers 32 are disposed on the support contacting area 112 of the image sensing chip 11, and the micro spacers 32 are separated from the image sensing area 110 and the conductive pads 111 for preventing the image sensing area 110 and the conductive pads 111 from being contacted by the micro spacers 32. For example, the micro spacers 32 may be formed by etching or laminating. The micro spacers 32 have the same size, thus the height of the light-transmitting leveling substrate 31 relative to the image sensing chip 11 can be adjusted according to the micro spacers 32 having the same size.

Whereby, when the housing frame 20 is disposed on the image sensing chip 11 through the leveling auxiliary unit 3, the light-transmitting leveling substrate 31 can be supported above the image sensing chip 11 by the micro spacers 32 having the same size, and the housing frame 20 can be used to directly contact and downwardly abut against the light-transmitting leveling substrate 31, thus the first assembly tilt angle of the light-transmitting leveling substrate 31 relative to the image sensing area 110 of the image sensing chip 11 is very close to or the same as the second assembly tilt angle of the housing frame 20 relative to the flat top surface 310 of the light-transmitting leveling substrate 31. Hence, the assembly tilt angle of the housing frame 20 relative to the image sensing chip 11 can be reduced for ensuring the flatness of the housing frame 20 relative to the image sensing chip 11.

In other words, the instant disclosure provides an image capturing module M for reducing assembly tilt angle, comprising: an image sensing unit 1, an optical auxiliary unit 2 and a leveling auxiliary unit 3. The image sensing unit 1 includes a carrier substrate 10 and an image sensing chip 11 disposed on the carrier substrate 10 and electrically connected to the carrier substrate 10. The optical auxiliary unit 2 includes a housing frame 20 disposed on the carrier substrate 10 to cover the image sensing chip 11 and a lens assembly 21 disposed inside the housing frame 20 and above the image sensing chip 11. In addition, the leveling auxiliary unit 3 is supported above the image sensing chip 11, the housing frame 20 is disposed on the image sensing chip 11 through the leveling auxiliary unit 3, and the housing frame 20 can directly contact and downwardly abut against the light-transmitting leveling substrate 31.

Therefore, when the housing frame 20 is disposed on the image sensing chip 11 through the leveling auxiliary unit 3, the light-transmitting leveling substrate 31 can be supported above the image sensing chip 11 by the micro support bodies 301 having the same size or the micro spacers 32 having the same size, and the housing frame 20 can be used to directly contact and downwardly abut against the light-transmitting leveling substrate 31, thus the first assembly tilt angle of the light-transmitting leveling substrate 31 relative to the image sensing area 110 of the image sensing chip 11 is very close to or the same as the second assembly tilt angle of the housing frame 20 relative to the flat top surface 310 of the light-transmitting leveling substrate 31. Hence, the assembly tilt angle of the housing frame 20 relative to the image sensing chip 11 can be reduced for ensuring the flatness of the housing frame 20 relative to the image sensing chip 11.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An image capturing module for reducing assembly tilt angle, comprising:
   an image sensing unit including a carrier substrate and an image sensing chip disposed on the carrier substrate and electrically connected to the carrier substrate;
   an optical auxiliary unit including a housing frame disposed on the carrier substrate to cover the image sensing chip and a lens assembly disposed inside the housing frame and above the image sensing chip; and
   a leveling auxiliary unit including a plurality of adhesive materials disposed on the image sensing chip and a light-transmitting leveling substrate supported above the image sensing chip by the adhesive materials, wherein the housing frame directly contacts and downwardly abuts against the light-transmitting leveling substrate, and each adhesive material is formed by mixing adhesive glue and a plurality of micro support bodies;
   wherein the image sensing chip has an image sensing area, a plurality of conductive pads and a support contacting area that is not occupied by the image sensing area and the conductive pads, and the image sensing area, the conductive pads and the support contacting area are disposed on the top side of the image sensing chip, wherein the adhesive materials are disposed on the support contacting area of the image sensing chip, and the adhesive materials are separated from the image sensing area and the conductive pads for preventing the image sensing area and the conductive pads from being contacted by the adhesive materials.

2. The image capturing module of claim 1, wherein the image sensing chip has an image sensing area on the top side thereof for providing a first alignment base level, and the light-transmitting leveling substrate has a flat top surface on the top side thereof for providing a second alignment base level, wherein the light-transmitting leveling substrate is disposed on the first alignment base level of the image sensing area of the image sensing chip for obtaining a first assembly tilt angle of the light-transmitting leveling substrate relative to the image sensing area of the image sensing chip, and the housing frame is disposed on the second alignment base level of the flat top surface of the light-transmitting leveling substrate for obtaining a second assembly tilt angle of the housing frame relative to the flat top surface of the light-transmitting leveling substrate, wherein the first assembly tilt angle is close to or the same as the second assembly tilt angle.

3. The image capturing module of claim 1, wherein the light-transmitting leveling substrate is a flat glass plate, the micro support bodies are microspheres having the same size, and the height of the light-transmitting leveling substrate relative to the image sensing chip is adjusted according to the microspheres of the same size.

4. An image capturing module for reducing assembly tilt angle, comprising:
   an image sensing unit including a carrier substrate and an image sensing chip disposed on the carrier substrate and electrically connected to the carrier substrate;
   an optical auxiliary unit including a housing frame disposed on the carrier substrate to cover the image sensing chip and a lens assembly disposed inside the housing frame and above the image sensing chip; and
   a leveling auxiliary unit supported above the image sensing chip, wherein the leveling auxiliary unit includes a plurality of adhesive materials and a light-transmitting leveling substrate, the housing frame is disposed on the image sensing chip through the leveling auxiliary unit, and the housing frame directly contacts and downwardly abuts against the light-transmitting leveling substrate;
   wherein the image sensing chip has an image sensing area, a plurality of conductive pads and a support contacting area that is not occupied by the image sensing area and the conductive pads, and the image sensing area, the conductive pads and the support contacting area are disposed on the top side of the image sensing chip, wherein the adhesive materials are disposed on the support contacting area of the image sensing chip, and the adhesive materials are separated from the image sensing area and the conductive pads for preventing the image sensing area and the conductive pads from being contacted by the adhesive materials.

5. The image capturing module of claim 4, wherein the image sensing chip has an image sensing area on the top side thereof for providing a first alignment base level, and the light-transmitting leveling substrate has a flat top surface on the top side thereof for providing a second alignment base level, wherein the light-transmitting leveling substrate is disposed on the first alignment base level of the image sensing area of the image sensing chip for obtaining a first assembly tilt angle of the light-transmitting leveling substrate relative to the image sensing area of the image sensing chip, and the housing frame is disposed on the second alignment base level of the flat top surface of the light-transmitting leveling substrate for obtaining a second assembly tilt angle of the housing frame relative to the flat top surface of the light-transmitting leveling substrate, wherein the first assembly tilt angle is close to or the same as the second assembly tilt angle.

* * * * *